United States Patent
Sun et al.

(10) Patent No.: US 9,575,773 B2
(45) Date of Patent: Feb. 21, 2017

(54) MONITORING MULTIPLE REMOTE DESKTOPS ON A WIRELESS DEVICE

(71) Applicant: VMware, Inc., Palo Alto, CA (US)

(72) Inventors: Chao Sun, Beijing (CN); Sheng Lu, Beijing (CN); Chang Yan Chi, Beijing (CN); Yu Xin Kou, Beijing (CN)

(73) Assignee: VMware, Inc., Palo Alto, CA (US)

( * ) Notice: Subject to any disclaimer, the term of this patent is extended or adjusted under 35 U.S.C. 154(b) by 431 days.

(21) Appl. No.: 14/060,634

(22) Filed: Oct. 23, 2013

(65) Prior Publication Data

US 2015/0113424 A1   Apr. 23, 2015

(51) Int. Cl.
  *G06F 15/16*   (2006.01)
  *G06F 9/44*    (2006.01)

(52) U.S. Cl.
  CPC .................. *G06F 9/4445* (2013.01)

(58) Field of Classification Search
  CPC ........ G06F 9/4445; G06F 11/30; H04L 12/26; H04L 41/00; H04L 43/00
  USPC ........................................ 709/203, 223, 224
  See application file for complete search history.

(56) References Cited

U.S. PATENT DOCUMENTS

| | | | |
|---|---|---|---|
| 5,303,388 A | | 4/1994 | Kreitman et al. |
| 6,820,049 B1* | | 11/2004 | Monroe et al. .................. 703/21 |
| 7,356,679 B1* | | 4/2008 | Le et al. ........................... 713/1 |
| 8,209,408 B1 | | 6/2012 | Huang et al. |
| 8,253,732 B2 | | 8/2012 | Hamill et al. |
| 8,264,494 B2 | | 9/2012 | Kilani et al. |
| 8,667,490 B1* | | 3/2014 | van der Goot ..... G06F 9/45558 711/162 |
| 8,856,202 B2* | | 10/2014 | McCabe et al. ............... 709/200 |
| 2002/0144233 A1* | | 10/2002 | Chong et al. .................. 717/105 |
| 2003/0220999 A1* | | 11/2003 | Emerson ....................... 709/224 |
| 2004/0210850 A1* | | 10/2004 | Bermudez et al. ........... 715/848 |
| 2005/0021833 A1* | | 1/2005 | Hundscheid et al. ........ 709/236 |

(Continued)

FOREIGN PATENT DOCUMENTS

EP    2538241 A2    12/2012

OTHER PUBLICATIONS

"Remote Desktops & 3D Visualization", HPC Service, University of Cambridge, <Retrieved from the Internet at URL: http://web.archive.org/web/20120713010742/http://www.hpc.cam.ac.uk/user/visualization.html>, Jul. 13, 2012.

(Continued)

*Primary Examiner* — Michael Y Won

(57) ABSTRACT

Methods and systems configured to facilitate monitoring of multiple remote desktops in a user interface of a wireless device are provided. One example method includes maintaining image data representing a prior state of graphical displays of a plurality of graphical user interfaces associated with the remote desktops, in response to receiving a first request specifying first display information from the wireless device, preparing first update information for a first scaled image corresponding to content of a first graphical display, wherein the first scaled image contains image data defining a lower resolution version of a current state of a first graphical display out of the graphical displays, the scaled version is being sized according to the first display information received from the wireless device, and transmitting the prepared first update information to the wireless device to be displayed in the user interface.

11 Claims, 4 Drawing Sheets

(56) References Cited

U.S. PATENT DOCUMENTS

| | | | |
|---|---|---|---|
| 2005/0097618 A1* | 5/2005 | Arling et al. | 725/114 |
| 2005/0125530 A1 | 6/2005 | Brockway et al. | |
| 2006/0010176 A1* | 1/2006 | Armington | G06F 9/4856 |
| 2006/0089995 A1* | 4/2006 | Kerr | G06F 9/4856 |
| | | | 709/227 |
| 2006/0155930 A1* | 7/2006 | Birrell | G06F 3/061 |
| | | | 711/113 |
| 2006/0218544 A1* | 9/2006 | Chakraborty | G06F 8/63 |
| | | | 717/168 |
| 2008/0025628 A1* | 1/2008 | De Haan | G06T 5/003 |
| | | | 382/255 |
| 2008/0201414 A1* | 8/2008 | Amir Husain | G06F 9/445 |
| | | | 709/203 |
| 2008/0316218 A1 | 12/2008 | Kilani et al. | |
| 2009/0044185 A1* | 2/2009 | Krivopaltsev | 717/173 |
| 2009/0222468 A1* | 9/2009 | Alpern | G06F 17/30 |
| 2010/0001995 A1 | 1/2010 | Hamill et al. | |
| 2010/0191487 A1* | 7/2010 | Rada et al. | 702/60 |
| 2011/0055714 A1* | 3/2011 | Vemulapalli | G06F 9/5077 |
| | | | 715/739 |
| 2011/0103705 A1* | 5/2011 | Lee | H04N 19/29 |
| | | | 382/251 |
| 2011/0251807 A1* | 10/2011 | Rada et al. | 702/61 |
| 2012/0005672 A1* | 1/2012 | Cervantes | G06F 9/5077 |
| | | | 718/1 |
| 2012/0254288 A1 | 10/2012 | Lejeune et al. | |
| 2012/0324446 A1* | 12/2012 | Fries | G06F 21/64 |
| | | | 718/1 |
| 2013/0117359 A1* | 5/2013 | Husain | G06F 9/445 |
| | | | 709/203 |
| 2013/0219285 A1* | 8/2013 | Iwasaki | 715/740 |
| 2013/0272613 A1* | 10/2013 | Bodin et al. | 382/182 |
| 2014/0006605 A1* | 1/2014 | Frei et al. | 709/224 |
| 2015/0058409 A1* | 2/2015 | Wang | 709/203 |
| 2015/0106756 A1* | 4/2015 | Jitkoff et al. | 715/765 |
| 2015/0113424 A1* | 4/2015 | Sun | G06F 9/4445 |
| | | | 715/740 |
| 2015/0135174 A1* | 5/2015 | Bonzini | G06F 9/45558 |
| | | | 718/1 |
| 2015/0309970 A1* | 10/2015 | Wuellner et al. | 715/234 |

OTHER PUBLICATIONS

Rohan Naravane, "Micromax Qube X550 Review", <Retrieved from the Internet at URL: http://archive.techtree.com/techtree/jsp/article.jsp?article_id=113856&cat_id=614&page=3>, Dec. 21, 2010.

"SurfCube 3D Browser", <Retrieved from the Internet at URL: http://web.archive.org/web/20120928144939/http://www.windowsphone.com/en-us/store/app/surfcube-3d-browser/e85aa5bb-cf53-e011-854c-00237de2db9e>, Mar. 24, 2011, Kinabalu Innovation Limited.

* cited by examiner

MONITORING MULTIPLE REMOTE DESKTOPS ON A WIRELESS DEVICE

BACKGROUND

Virtualization technologies are becoming ubiquitous in the marketplace. These technologies may provide a virtual hardware abstraction to guest operating systems, so that applications may run in a functionally isolated environment on a host computer. Virtualization allows multiple instances of a virtual machine to run on one or more physical host computers, so that these virtual machines may share the resources of the one or more physical host computers.

To manage or monitor the desktop operating systems associated with the multiple virtual machines, one convention approach is to utilize a wall of monitors. Not only is such an approach costly, but it is also likely to require significant physical space and power to operate. Another conventional approach is to display the desktops on a user interface of a computing device. Due to network bandwidth constraints, such an approach tends to be limited to displaying relatively static desktop images.

SUMMARY

Methods and systems configured to facilitate monitoring of multiple remote desktops in a user interface of a wireless device are provided. One example method includes maintaining image data representing a prior state of graphical displays of a plurality of graphical user interfaces associated with the remote desktops, and in response to receiving a first request specifying first display information from the wireless device, preparing first update information for a first scaled image corresponding to content of a first graphical display. The first scaled image contains image data defining a lower resolution version of a current state of a first graphical display out of the graphical displays, and the scaled version is being sized according to the first display information received from the wireless device. The example method also includes transmitting the prepared first update information to the wireless device to be displayed in the user interface.

DETAILED DESCRIPTION

Figure 1:
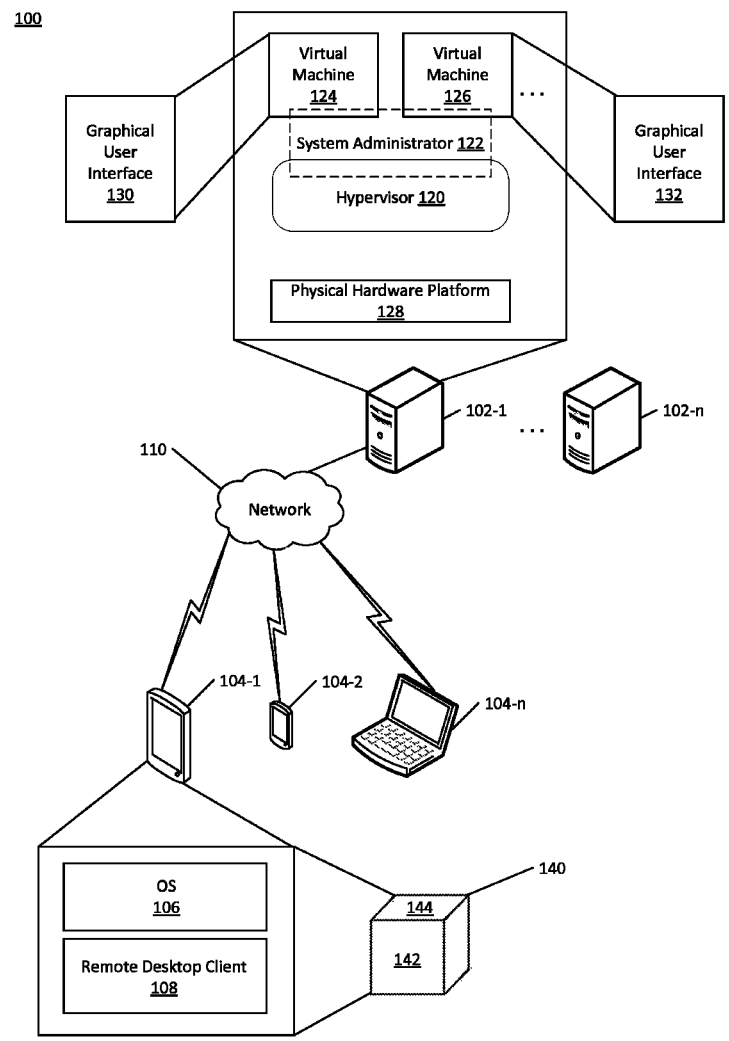
FIG. 1 is a block diagram illustrating a simplified view of a system, in accordance with at least some embodiments of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

Throughout this disclosure, "desktop environment" generally refers to an implementation of a desktop metaphor graphical user interface. "Remote desktop" generally refers to a desktop environment that can be run remotely on a host system. Although the graphical user interface associated with a remote desktop is often illustrated to be associated with a virtual machine (VM), it should be recognized that such a graphical user interface may instead be associated with a physical computing device that can be accessed remotely.

FIG. 1 is a block diagram illustrating a simplified view of a system 100, in accordance with at least some embodiments of the present disclosure. System 100 includes one or more host systems 102-1 to 102-n (collectively as "host systems 102") that are coupled to a network 110 (e.g., the Internet). The system 100 also includes multiple devices 104-1, 104-2, 104-3, and others (collectively as "devices 104") that are coupled to the network 110. The devices 104 may be smart phones, tablet computers, laptop computers, desktop computers, and other computing devices.

The system 100 may be configured to support desktop virtualization, which generally refers to technologies that separate the desktop environment and associated application software from the physical device that is used to access it. In one embodiment, each of the devices 104 may include an operating system (OS) 106 and a remote desktop client 108 running on the OS 106. The remote desktop client 108 enables the devices 104 to interact with an application executing in the host systems 102 using a remote display protocol. Some example remote display protocols may include, without limitation, Remote Desktop Protocol (RDP) and PC-over-IP (PCoIP).

The host systems 102 may be configured to support a virtualization software layer, or for example, a hypervisor 120, which is implemented based on a hardware platform 128. The hypervisor 120 may support a virtual machine execution space within which one or more virtual machines (VMs), such as VMs 124 and 126, may be concurrently instantiated and executed. The host systems 102 may also include a system administrator 122 having functions supported by the VMs and the hypervisor 120. The system administrator 122 may be configured to monitor and manage multiple VMs. In the illustrated example shown in FIG. 1, the devices 104-2 and 104-3 access their remote desktops, which are associated with the VMs 124 and 126, respectively, via the network 110. For a specific VM (e.g., VM 124 or VM 126), the hypervisor 120 may provide a corresponding virtual hardware platform dedicated to provide virtualized hardware services to the specific VM. Such a virtual hardware platform may contain virtual hardware components such as, without limitation, virtual storage, virtual network interface card (NIC), virtual memory, and one or more virtual processors. These virtual hardware components may emulate corresponding physical hardware components similar to the ones in the physical hardware platform 128. In one embodiment, the virtual hardware platform may support operating systems such as, without limitation, Microsoft Windows®, Linux®, Solaris® x86, NetWare, and FreeBSD.

It should be recognized that the various terms, layers and categorizations used to describe the virtualization components in conjunction with FIG. 1 may be referred to differently without departing from their functionalities or the spirit and scope of the present disclosure. It should further be recognized that other virtualized computer system architectures may be used along with the teachings herein. For example, the hypervisor 120 may be designed to run on top of an operating system that can directly access the physical hardware platform 128.

In one embodiment, the device 104-1 may be configured to monitor the remote desktops of the device 104-2 and the device 104-3, so that a user interface 140 of the device 104-1 could display graphical user interfaces 130 and 132, which are associated with the VMs 124 and 126, respectively. To illustrate, suppose the user interface 140 of the device 104-1 is configured to arrange clickable and/or viewable elements in a three-dimensional (3D) cube. In some implementations, the geometric data for the 3D cube may be defined and generated by the device 104-1. Alternatively, the geometric data for the 3D cube may be generated by the host systems 102. By using a texture mapping technique, the device 104-1 may apply a scaled image (e.g., a thumbnail) corresponding to the contents of the graphical display associated with the graphical user interface 130 to a surface 142 of the 3D cube and apply another scaled image corresponding to the contents of the graphical display associated with the graphical user interface 132 to a surface 144. It should be recognized that the device 104-1 may support many other user interfaces or display the scaled images in different ways without departing from the spirit and scope of the present disclosure. For example, the user interface 140 may support other 3D objects (e.g., sphere) that could displays multiple scaled images. Also, the scaled images corresponding to the graphical user interfaces 130 and graphical user interface 132 may both appear on a single surface (e.g., the surface 142) of the cube.

Figure 2:
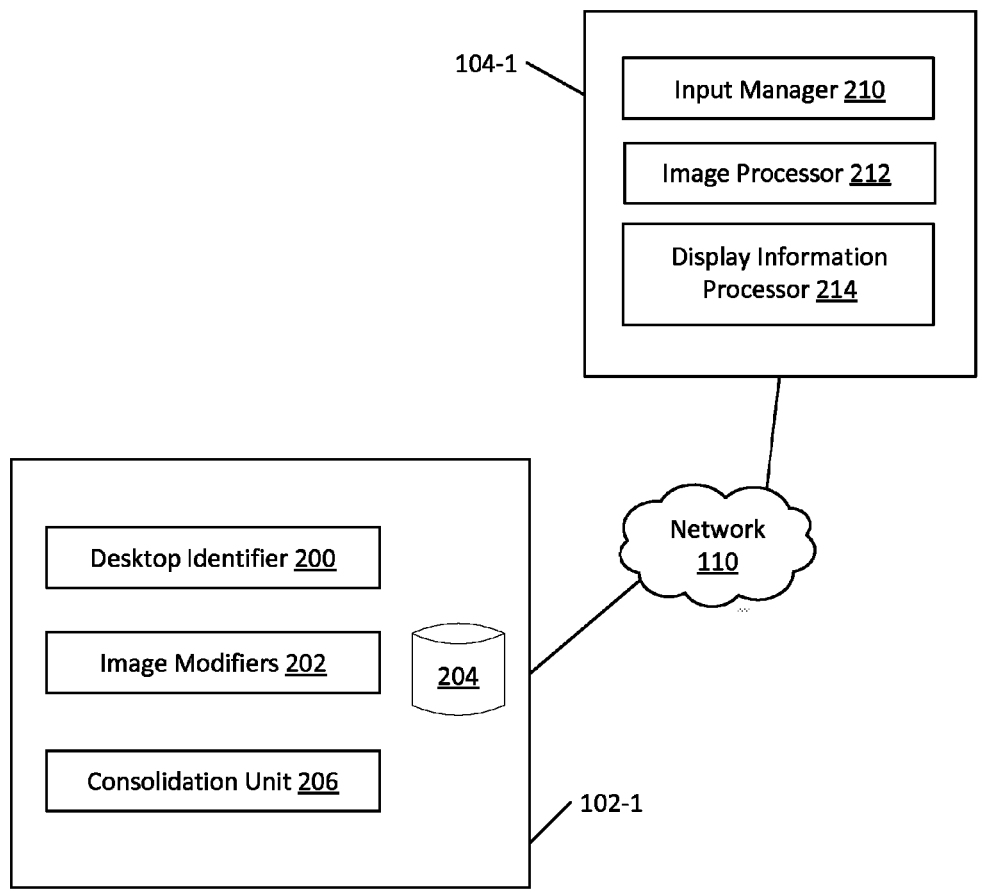
FIG. 2 illustrates example block diagrams of a device and a host system of FIG. 1 that are configured to facilitate the monitoring of remote desktops, in accordance with at least some embodiments of the present disclosure.

FIG. 2 illustrates example block diagrams of the device 104-1 and the host system 102-1 of FIG. 1 that are configured to facilitate the monitoring of remote desktops, in accordance with at least some embodiments of the present disclosure. In one embodiment, the host system 102-1 includes a desktop identifier 200, one or more image modifiers 202, one or more image data storages 204, and a consolidation unit 206. It should be noted that the functions associated with any of the aforementioned blocks may be further divided or combined and may also be supported by the system administrator 122 of FIG. 1. Briefly, the desktop identifier 200 is configured to identify the appropriate desktop, or the graphical user interface (e.g., the graphical user interfaces 130 and/or 132) of the appropriate VM (e.g., VMs 124 and/or 126), to be displayed on the device 104-1. Each of the image modifiers 202 is configured to modify the identified graphical user interface of the VM. For example, from time to time, the image modifier 202 may generate a scaled image having a reduced resolution (e.g., a thumbnail image) of the identified graphical user interface. Each of the image modifiers 202 may also be coupled to its image data storage 204, so that the modified image data, which are generated at different times, can be maintained. The consolidation unit 206 is configured to collect all the scaled images that are destined for the same device configured to monitor the graphical user interfaces 130 and 132 (e.g., the device 104-1), prepare update information associated with the scaled images, and transmit the prepared update information in a manner that would consume less network bandwidth. Subsequent paragraphs will further detail the operations of the host system 102-1.

In one embodiment, the device 104-1 includes an input manager 210, an image processor 212, and a display information processor 214. Similarly, it should be noted that the functions associated with any of the aforementioned blocks may be further divided or combined and may also be supported by the OS 106, the remote desktop client 108, or the combination of the two components of FIG. 1. Briefly, the input manager 210 is configured to process any input data received by the device 104-1. For example, based on the input data, the input manager 210 may determine that the surface 142 of the user interface 140 has become back-facing, and thus texture data for the surface is no longer needed. Based on the output of the input manager 210 and the image data received from host system 102-1, the image processor 212 is configured to determine how the newly received image data can be applied to update the user interface of the device 104-1. Based on the output of the input manager 210, the display information processor 214 is configured to generate requirements for the host system 102-1. For example, the host system 102-1 may be requested to transmit reduced-resolution images (e.g., thumbnail images), not full-resolution images, at certain sizes. Subsequent paragraphs will further detail the operations of the device 104-1.

Figure 3:
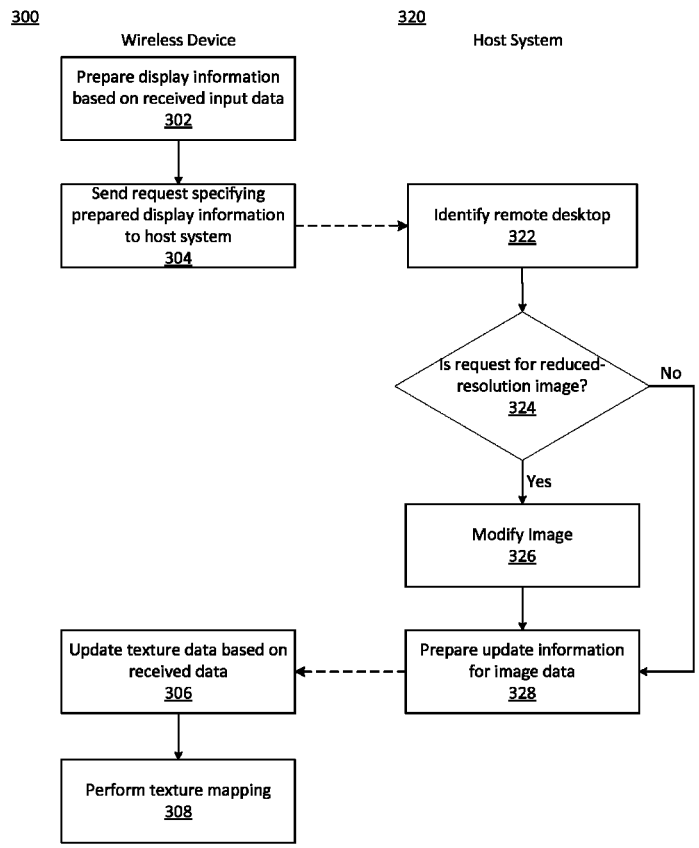
FIG. 3 illustrates flow diagrams for enabling a wireless device to monitor multiple remote desktops, in accordance with at least some embodiments of the present disclosure.

FIG. 3 illustrates flow diagrams for enabling a wireless device to monitor multiple remote desktops, in accordance with at least some of the present disclosure. Processes 300 and 320 may set forth various functional blocks or actions that may be described as processing steps, functional operations, events, and/or acts, which may be performed by hardware, software, and/or firmware. Those skilled in the art in light of the present disclosure will recognize that numerous alternatives to the functional blocks shown in FIG. 3 may be practiced in various implementations.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. Moreover, one or more of the outlined steps and operations may be performed in parallel.

In one embodiment, a wireless device, such as the device 104-1 of FIG. 1, is configured to perform the process 300, so that the contents of the remote desktops (e.g., the graphical user interfaces 130 and 132) are displayed on the user interface of the wireless device (e.g., the user interface 140). In conjunction with FIGS. 1 and 2, at block 302, the device 104-1 is configured to prepare display information based on the received input data. This prepared display information is intended for a host system, such as the host system 102-1 of FIG. 1, to send the appropriate image data associated certain remote desktops to the wireless device for the wireless device to apply the received image data as texture data to the surfaces of its user interface. As an example, the prepared display information may include any or all of the following information, a request for a reduced-resolution image, the surface of the user interface (e.g., the surface 142 of the user interface 140) that needs texture data, the surface update interval, the surface status (e.g., back-facing or not), and others.

Using the cube-like user interface 140 of FIG. 1 as an illustration, suppose the surface 142 is assigned to display the contents of the graphical user interface 130, and it is rotated in such a way so that it becomes back-facing. Then, the prepared display information may simply indicate that no texture information is needed for the surface 142. However, because of the rotation, a currently invisible surface of the user interface 140 becomes front-facing. Thus, the prepared display information may include a request for a reduced-resolution image associated with the graphical user interface assigned to this new surface and for the size of this new surface.

At block 304, the wireless device sends a request specifying the prepared display information to the host system. Block 304 is followed by block 306 in the process 300, where in response to the received data from the host system, the wireless device is configured to update its texture data. In one scenario, the wireless device may not update its texture data at all, because the received data may indicate that the changes in the remote desktop are not significant enough (e.g., less than a threshold value) to update, or the received data may indicate that no texture data is sent at all. In another scenario, the wireless device may update parts or all of its texture data based on the received data.

At block 306, the wireless device performs a texture mapping operation, so that the updated texture data are applied to the surface of any shape or polygon supported by the user interface of the wireless device.

In one embodiment, a host system, such as the host system 102-1 of FIG. 1, is configured to perform the process 320, so that the graphical user interfaces of the remote desktops can be efficiently delivered to the wireless device. At block 322, in response to receiving the prepared display information from the wireless device, the host system is configured to identify the appropriate remote desktop and its associated graphical user interface (e.g., the graphical user interface 130 of FIG. 1).

At block 324, the host system determines whether the contents of the requested graphical user interface needs to be modified. If so, then in one embodiment, the host system modifies the contents at block 326 by reducing the resolution of the contents to a lower resolution and also according to the requested size.

At block 328, the host system is configured to prepare update information for the image data, whether at reduced resolution or at full resolution. In one embodiment, for network bandwidth efficiency, the host system may compare the reduced-resolution images that are captured at different times and generate the update information that reflects the differences. To illustrate using the graphical user interface 130 of FIG. 1, based on the prepared display information received from the wireless device, the host system may modify a captured image of the graphical user interface 130 at its current state (e.g., state 2) by generating a thumbnail image (thumbnail (state 2)). The host system may be configured to maintain different states of the thumbnail, such as an earlier state (e.g., state 1), in its storage (e.g., the image data storage 204 of FIG. 2). One approach to prepare the update information for the thumbnail (state 2) may be to generate a difference between thumbnail (state 1) and thumbnail (state 2). In other words, instead of sending the full thumbnail to the wireless device, the host system is able to utilize less network bandwidth by transmitting just the differences.

In addition, the host system may be configured to continue preparing and sending update information for the image data to the mobile device, even though the host system may not have received a new request from the mobile device. To illustrate using the example above, the host system may continue to capture images of the user interface 130 at its state 3 (which occurs later in time than state 2), state 4 (which occurs later in time than state 3), and beyond. As long as there are differences between two adjacent states (e.g., state 2 and state 3 or state 3 and state 4), the host system may be configured to continue transmitting the differences to the mobile device, even though the mobile device has not sent the host system any request that specifies new prepared display information.

Moreover, since the host system may support multiple remote desktops, the preparation of the update information at block 328 may also include consolidating the image data associated with the different remote desktops to further improve the utilization of network bandwidth. To illustrate using the graphical user interfaces 130 and 132 of FIG. 1, suppose the host system has obtained the two thumbnails associated with the graphical user interfaces 130 and 132 (e.g., $thumbnail_{130}$ and $thumbnail_{132}$). Instead of transmitting both thumbnails in full, the host system may identify parts of the thumbnails that are the same. Then, the update information may include one copy of the parts for the two thumbnails that are the same and the remaining parts of the two thumbnails.

Figure 4:
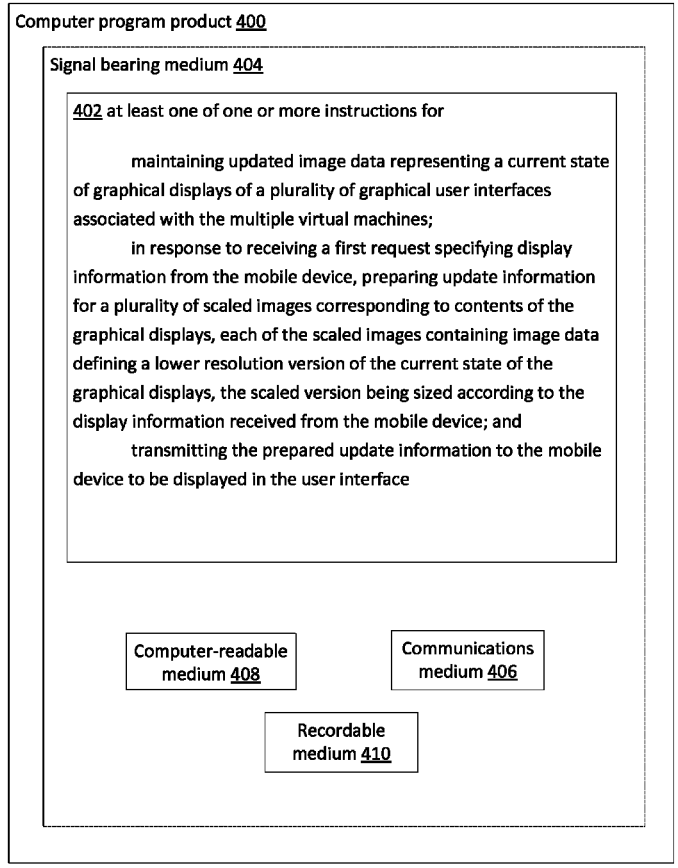
FIG. 4 is a block diagram illustrating a computer program product that implements a method to monitor multiple remote desktops, in accordance with at least some embodiments of the present disclosure.

FIG. 4 is a block diagram illustrating a computer program product 400 that implements a method to monitor multiple remote desktops, in accordance with at least some embodiments of the present disclosure. The computer program product 400 may include one or more sets of executable instructions 402 which, in response to execution by, for example, a host system, may provide at least the functionality described above with respect to the preceding figures.

In one embodiment, the computer program product 400 may include a signal bearing medium 404 or another similar communication medium 406. Computer program product 400 may also include a non-transitory computer readable medium 408 or another similar recordable medium 410. Some examples of the computer readable medium 408 may include a solid-state drive, a hard disk drive, a Compact Disc (CD), a Digital Video Disk (DVD), a digital tape, memory, and others. Some examples of the communication medium 406 may include a digital and/or an analog communication medium (e.g., a fiber optic cable, a waveguide, a wired communications link, a wireless communication link, etc.).

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method to facilitate monitoring of a first remote desktop and a second remote desktop that run in one or more host systems in a user interface of a wireless device, comprising:
   maintaining, by one of the one or more host systems, image data representing a prior state of a first graphical display of a first graphical user interface associated with the first remote desktop and a prior state of a second graphical display of a second graphical user interface associated with the second remote desktop;
   in response to receiving a request for the first graphical display and the second graphical display, which specifies first display information from the wireless device, preparing, by the one of the one or more host systems, update information by:
   comparing a first scaled image corresponding to content of the first graphical display and a second scaled image corresponding to content of the second graphical display, wherein the first scaled image and the second scaled image contain image data defining lower resolution versions of a current state of the first graphical display and a current state of the second graphical display, respectively, the scaled versions being sized according to the first display information received from the wireless device; and
   identifying and including one copy of parts of the first scaled image and the second scaled image that are the same and remaining parts of the first scaled image and the second scaled image in the prepared update information; and
   transmitting, by the one of the one or more host systems, the prepared update information to the wireless device to be displayed in the user interface.

2. The method of claim 1, wherein the preparing the update information comprises:
   determining a first difference between the first scaled image associated with the Prior state of the first graphical display and the first scaled image associated with the current state of the first graphical display;
   determining a second difference between the second scaled image associated with the prior state of the second graphical display and the second scaled image associated with the current state of the first graphical display; and
   preparing the update information based on the first difference and the second difference.

3. The method of claim 1, wherein the first display information includes a size for a scaled image and one or more of information relating to surface that needs texture, surface update interval, and surface status for the user interface of the wireless device.

4. The method of claim 2, further comprising repeating the preparing the update information and the transmitting the prepared update information to the wireless device until having received a new request specifying second display information, wherein the second display information differs from the first display information.

5. A non-transitory computer-readable storage medium containing a set of executable instructions which, in response to execution by a processor in one of one or more host systems, cause the processor to perform a method to facilitate monitoring of a first remote desktop and a second remote desktop that run in the one or more host systems in a user interface of a wireless device, the method comprising:
   maintaining image data representing a prior state of a first graphical display of a first graphical user interface associated with the first remote desktop and a prior state of a second graphical display of a second graphical user interface associated with the second remote desktop;
   in response to receiving a request for the first graphical display and the second graphical display, which specifies first display information from the wireless device, preparing update information by:
   comparing a first scaled image corresponding to content of the first graphical display and a second scaled image corresponding to content of the second graphical display, wherein the first scaled image and the second scaled image contain image data defining lower resolution versions of a current state of the first graphical display and a current state of the second graphical display, respectively, the scaled versions being sized according to the first display information received from the wireless device; and
   identifying and including one copy of parts of the first scaled image and the second scaled image that are the same and remaining parts of the first scaled image and the second scaled image in the prepared update information; and
   transmitting the prepared update information to the wireless device to be displayed in the user interface.

6. The non-transitory computer-readable storage medium of claim 5, wherein the preparing the update information comprises:
   determining a first difference between the first scaled image associated with the prior state of the first graphical display and the first scaled image associated with the current state of the first graphical display;
   determining a second difference between the second scaled image associated with the prior state of the second graphical display and the second scaled image associated with the current state of the first graphical display; and
   preparing the update information based on the first difference and the second difference.

7. The non-transitory computer-readable storage medium of claim 5, wherein the first display information includes a size for a scaled image and one or more of information relating to surface that needs texture, surface update interval, and surface status for the user interface of the wireless device.

8. The non-transitory computer-readable storage medium of claim 6, wherein the method further comprising repeating the preparing the update information and the transmitting the prepared first update information to the wireless device until having received a new request specifying second display information, wherein the second display information differs from the first display information.

9. A system in one or more host systems configured to facilitate monitoring of a first remote desktop and a second remote desktop that run in the one or more host systems in a user interface of a wireless device, comprising:
   a storage; and
   a processor, wherein the processor is configured to
   maintain image data representing a prior state of a graphical display of a first graphical user interface associated with the first remote desktop and a prior state of a second graphical display of a second graphical user interface associated with the second remote desktop;
   in response to receiving a request for the first graphical display and the second graphical display, which specifies first display information from the wireless device, prepare update information by:

comparing a first scaled image corresponding to content of the first graphical display and a second scaled image corresponding to content of the second graphical display, wherein the first scaled image and the second scaled image contain image data defining lower resolution versions of a current state of the first graphical display and a current state of the second graphical display, respectively, the scaled versions being sized according to the first display information received from the wireless device; and identifying and including one copy of parts of the first scaled image and the second scaled image that are the same and remaining parts of the first scaled image and the second scaled image in the prepared update information; and transmit the prepared update information to the wireless device to be displayed in the user interface.

10. The system of claim 9, wherein the processor is configured to prepare the update information by:

determining a first difference between the first scaled image associated with the prior state of the first graphical display and the first scaled image associated with the current state of the first graphical display;

determining a second difference between the second scaled image associated with the prior state of the second graphical display and the second scaled image associated with the current state of the first graphical display; and preparing the update information based on the first difference and the second difference.

11. The system of claim 9, wherein the first display information includes a size for a scaled image and one or more of information relating to surface that needs texture, surface update interval, and surface status for the user interface of the wireless device.

* * * * *